United States Patent
Lin et al.

(10) Patent No.: US 11,568,590 B2
(45) Date of Patent: Jan. 31, 2023

(54) CARTOONLIZATION PROCESSING METHOD FOR IMAGE, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Tianwei Lin, Beijing (CN); Fu Li, Beijing (CN); Xin Li, Beijing (CN); Henan Zhang, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/373,420

(22) Filed: Jul. 12, 2021

(65) Prior Publication Data

US 2021/0343065 A1 Nov. 4, 2021

(30) Foreign Application Priority Data

Aug. 20, 2020 (CN) .......................... 202010844614.3

(51) Int. Cl.
*G06T 5/50* (2006.01)
*G06T 7/11* (2017.01)
(Continued)

(52) U.S. Cl.
CPC .............. *G06T 15/02* (2013.01); *G06T 5/50* (2013.01); *G06T 7/11* (2017.01); *G06T 7/90* (2017.01);
(Continued)

(58) Field of Classification Search
CPC ..... G06T 7/90; G06T 7/11; G06T 5/50; G06T 11/001; G06T 15/02; G06T 7/136;
(Continued)

(56) References Cited

U.S. PATENT DOCUMENTS

| 10,748,322 | B1 | 8/2020 | Pishevar | |
| 2006/0104491 | A1* | 5/2006 | Liu | G06T 7/74 |
| | | | | 382/118 |

(Continued)

FOREIGN PATENT DOCUMENTS

| CN | 108269290 A | * | 7/2018 | ............... G06T 7/11 |
| CN | 20180053781 A | * | 12/2018 | ............... G06T 7/90 |

(Continued)

OTHER PUBLICATIONS

Office Action for Korean Application No. 10-2021-0107383, dated Aug. 26, 2022, 5 pages.

(Continued)

*Primary Examiner* — Wesner Sajous
(74) *Attorney, Agent, or Firm* — Fay Sharpe LLP (57) ABSTRACT

The disclosure discloses a cartoonlization processing method for an image, and relates to a field of computational vision, image processing, face recognition, deep learning technologies. The method includes: performing skin color recognition on a facial image to be processed to determine a target skin color of a face in the facial image; processing the facial image by utilizing any cartoonizing model in a cartoonizing model set to obtain a reference cartoonized image corresponding to the facial image in a case that the cartoonizing model set does not contain a cartoonizing model corresponding to the target skin color; determining a pixel adjustment parameter based on the target skin color and a reference skin color corresponding to the any cartoonizing model; and adjusting a pixel value of each pixel (Continued)

point in the reference cartoonized image based on the pixel adjustment parameter, to obtain a target cartoonized image corresponding to the facial image.

17 Claims, 3 Drawing Sheets (51) Int. Cl.
| | |
|---|---|
| G06T 7/90 | (2017.01) |
| G06T 15/02 | (2011.01) |
| G06T 11/00 | (2006.01) |
| G09G 5/02 | (2006.01) |
| H04N 1/60 | (2006.01) |
| G06V 40/16 | (2022.01) |

(52) U.S. Cl.
CPC .......... *G06T 11/001* (2013.01); *G06V 40/171* (2022.01); *G06T 2207/20221* (2013.01); *G06T 2207/30201* (2013.01)

(58) Field of Classification Search
CPC .......... G06T 2207/30201; G06T 2207/20221; G06V 40/171; G06V 40/173; G06V 40/394; G06V 40/197; G06V 40/162; G06V 40/16; G09G 5/02; G09G 2320/0666; H04N 1/60; H04N 1/6041
See application file for complete search history.

(56) References Cited

U.S. PATENT DOCUMENTS

| | | | |
|---|---|---|---|
| 2010/0007665 A1* | 1/2010 | Smith | G06T 13/40 |
| | | | 345/473 |
| 2011/0115786 A1 | 5/2011 | Mochizuki | |
| 2013/0094780 A1* | 4/2013 | Tang | G06T 11/60 |
| | | | 382/284 |
| 2018/0260994 A1* | 9/2018 | Li | G06T 13/40 |
| 2018/0308276 A1* | 10/2018 | Cohen | G06T 13/40 |
| 2019/0266806 A1 | 8/2019 | Aluru et al. | |

FOREIGN PATENT DOCUMENTS

| | | |
|---|---|---|
| JP | 2016519822 A | 7/2016 |
| JP | 2020064426 A | 4/2020 |

OTHER PUBLICATIONS

Office Action for Japanese Application No. 2021-079945, dated Jul. 12, 2022, 4 pages.

* cited by examiner

CARTOONLIZATION PROCESSING METHOD FOR IMAGE, ELECTRONIC DEVICE, AND STORAGE MEDIUM

CROSS-REFERENCE TO RELATED APPLICATION

This application claims priority to and benefits of Chinese Patent Application Serial No. 202010844614.3, filed with the State Intellectual Property Office of P. R. China on Aug. 20, 2020, the entire content of which is incorporated herein by reference.

FIELD

The disclosure relates to a field of computer technologies and particularly to a field of computational vision, image processing, face recognition, deep learning technologies, and particularly relates to a cartoonlization processing method for an image, an electronic device, and a storage medium.

BACKGROUND

Portrait cartoonlization is a commonly used method for image style transformation.

In the related art, current training data of cartoonized portraits are mostly light skin. Therefore, when face style transformation processing is performed by employing a model generated by training, a generated cartoonized face is also a light skin color. That is, a current cartoonlization processing model may only process a user with a light skin color.

SUMMARY

According to an aspect of the disclosure, a cartoonlization processing method for an image is provided. The method includes: performing skin color recognition on a facial image to be processed to determine a target skin color of a face in the facial image; processing the facial image by utilizing any cartoonizing model in a cartoonizing model set to obtain a reference cartoonized image corresponding to the facial image in a case that the cartoonizing model set does not contain a cartoonizing model corresponding to the target skin color; determining a pixel adjustment parameter based on the target skin color and a reference skin color corresponding to the any cartoonizing model; and adjusting a pixel value of each pixel point in the reference cartoonized image based on the pixel adjustment parameter, to obtain a target cartoonized image corresponding to the facial image.

According to another aspect of the disclosure, an electronic device is provided. The electronic device includes: at least one processor and a memory. The memory is communicatively coupled to the at least one processor. The memory is configured to store instructions executable by the at least one processor. The at least one processor is caused to implement the cartoonlization processing method for the image according to any aspect of the disclosure when the instructions are executed by the at least one processor.

According to another aspect of the disclosure, a non-transitory computer readable storage medium having computer instructions stored thereon is provided. The computer instructions are configured to cause a computer to execute the cartoonlization processing method for the image according to any aspect of the disclosure.

Other effects of the above alternative implementation will be described in the following with detailed examples.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Description will may be made below to a cartoonlization processing method for an image, a cartoonlization processing apparatus for an image, an electronic device, and a storage medium according to embodiments of the disclosure with reference to accompanying drawings.

Figure 1:
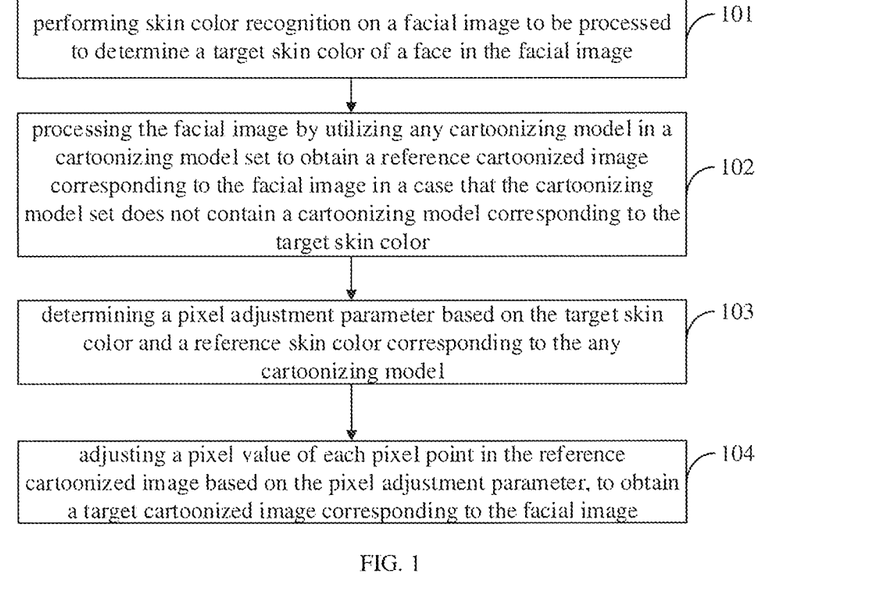
FIG. 1 is a flow chart illustrating a cartoonlization processing method for an image according to embodiments of the disclosure.

FIG. 1 is a flow chart illustrating a cartoonlization processing method for an image according to some embodiments of the disclosure.

The cartoonlization processing method for an image according to embodiments of the disclosure may be executed by a cartoonlization processing apparatus for an image according to embodiments of the disclosure. The apparatus may be configured in an electronic device to implement cartoonlization processing of objects with various skin colors by utilizing an existing cartoonizing model.

As illustrated in FIG. 1, the cartoonlization processing method for the image includes the following.

At block 101, skin color recognition is performed on a facial image to be processed to determine a target skin color of a face in the facial image.

In some embodiments, the facial image to be processed may be a facial image captured by a camera of an electronic device, a facial image extracted from a captured image, or a facial image extracted from a video frame of a video.

When the skin color recognition is performed, face detection may be performed in advance to determine a facial region. Pixel values of respective pixels in the facial region are obtained, and an average value of all the pixels in the facial region is calculated. Then, a pixel value range where the average value of all the pixels in the facial region in the facial image to be processed is determined based on a preset correspondence relation between pixel value ranges and various skin colors, thereby a skin color corresponding to the pixel value range is determined as a skin color of the face in the facial image, which is referred as the target skin color here.

Alternatively, the target skin color of the face in the facial image may be determined based on skin color information of the facial image inputted by the user. Alternatively, skin color recognition may be performed on the facial image by utilizing a pre-trained skin color recognition model to determine the target skin color of the face in the facial image.

At block 102, the facial image is processed by utilizing any cartoonizing model in a cartoonizing model set to obtain a reference cartoonized image corresponding to the facial image to be processed in a case that the cartoonizing model set does not contain a cartoonizing model corresponding to the target skin color.

In embodiments, the cartoonizing model set includes a cartoonizing model corresponding to at least one skin color. A cartoonizing model corresponding to a certain skin color is configured to convert a facial image with the certain skin color into a cartoonized image with the certain skin color. For example, a cartoonizing model corresponding to a skin color A may convert a facial image with the skin color A into a cartoonized image, and a skin color of the cartoonized image is the same as or close to the skin color A.

After the target skin color of the face in the facial image is obtained, it is determined whether the cartoonizing model set includes the cartoonizing model corresponding to the target skin color based on a correspondence between skin colors and cartoonizing models in the cartoonizing model set. When the cartoonizing model corresponding to the target skin color is included, the cartoonizing model corresponding to the target skin color is used to process the facial image to obtain the cartoonized image corresponding to the target skin color. When the cartoonizing model set does not include the cartoonizing model corresponding to the target skin color, any cartoonizing model in the cartoonizing model set may be used to process the facial image to obtain the cartoonized image corresponding to the facial image, which is called the reference cartoonized image here.

For example, the skin color of the face in the facial image is black, and a cartoonizing model corresponding to black is not included in the cartoonizing model set. Since there are multiple pieces of light-colored training data, the cartoonizing model set includes cartoonizing models corresponding to light colors. The facial image is processed by utilizing a cartoonizing model corresponding to the light color, and a reference cartoonized image corresponding to the facial image with the light color is obtained.

At block 103, a pixel adjustment parameter is determined based on the target skin color and a reference skin color corresponding to the any cartoonizing model. In some embodiments, in the cartoonizing model set, the skin color corresponding to the cartoonizing model for processing the facial image is called the reference skin color. The cartoonizing model processes the facial image, and the skin color corresponding to the obtained cartoonized image is the reference skin color.

There is a difference between the reference skin color and the target skin color. Therefore, in some embodiments, the pixel adjustment parameter may be determined based on the target skin color and the reference skin color. For example, a correspondence between pixel adjustment parameters and differences between pixel values of two skin colors may established in advance. Then a pixel adjustment parameter corresponding to a difference between the pixel value of the target skin color and the pixel value of the reference skin color is determined based on the correspondence. When the pixel value of the target skin color is greater than that of the reference skin color, it is determined that the pixel adjustment parameter is greater than 1. The greater the difference, the greater the pixel adjustment coefficient is.

For one reference skin color, different target skin colors correspond to different pixel adjustment parameters.

At block 104, a pixel value of each pixel point in the reference cartoonized image is adjusted based on the pixel adjustment parameter to obtain a target cartoonized image corresponding to the facial image.

After the pixel adjustment parameter is determined, a new pixel value of each pixel is determined based on the pixel adjustment parameter and the pixel value of each pixel in the reference cartoonized image. For example, a product of the pixel value of each pixel in the cartoonized image and the pixel adjustment parameter is taken as the new pixel value. Then, the pixel value of each pixel in the cartoonized image is adjusted to the corresponding new pixel value, thereby obtaining the target cartoonized image corresponding to the target skin color.

In some embodiments, when the cartoonizing model corresponding to the skin color of the face in the facial image is not included in the cartoonizing model set, an existing cartoonizing model corresponding to other skin colors may be utilized to process the facial image to obtain the reference cartoonized image. Then, the pixel adjustment parameter is determined based on the skin color of the face in the facial image and the reference skin color corresponding to the existing cartoonizing model. The pixel value of each pixel in the reference cartoonized image is adjusted based on the pixel adjustment parameter to obtain the cartoonized image corresponding to the skin color of the face in the facial image.

With the cartoonlization processing method for an image according to embodiments of the disclosure, the skin color recognition is performed on the facial image to be processed to determine the target skin color of the face in the facial image. In the case that the cartoonizing model set does not contain the cartoonizing model corresponding to the target skin color, the facial image is processed by utilizing any cartoonizing model to obtain the reference cartoonized image corresponding to the facial image. The pixel adjustment parameter is determined based on the target skin color and the reference skin color corresponding to the any cartoonizing model. The pixel value of each pixel point in the reference cartoonized image is adjusted based on the pixel adjustment parameter to obtain the target cartoonized image corresponding to the facial image. In this way, when the cartoonizing model set does not contain the cartoonizing model corresponding to the target skin color of the facial image, the facial image is processed by utilizing an existing cartoonizing model to obtain the reference cartoonized image, and then the reference cartoonized image is adjusted based on the target skin color and the reference skin color corresponding to the existing cartoonizing model to obtain the cartoonized image corresponding to the target skin color. Therefore, by utilizing, the existing cartoonizing model, cartoonlization processing on objects with various skin colors may be implemented, and an application range is expanded.

Figure 2:
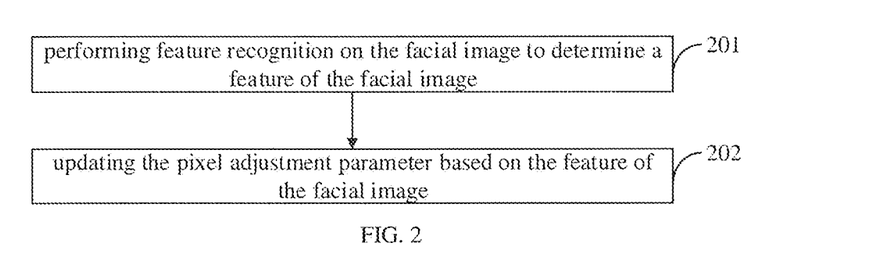
FIG. 2 is a flow chart illustrating a cartoonlization processing method for an image according to another embodiment of the disclosure.

In a practical application, a skin color of a cartoonized image varies with gender of people with the same skin color. Skin colors of a person in different ages may also be different. In order to further improve the cartoonlization processing effect, in some embodiments of the disclosure, after the pixel adjustment parameter is determined based oft the target skin color and the reference skin color, the pixel adjustment parameter may also be updated based on a feature of the facial image. Description will be made below with reference to FIG. 2. FIG. 2 is a flow chart illustrating a cartoonlization processing method for an image according to another embodiment of the disclosure.

As illustrated in FIG. 2, after determining the pixel adjustment parameter based on the target skin color and the reference skin color corresponding to the any cartoonizing model, the method further includes the following.

At block 201, feature recognition is performed on the facial image to determine a feature of the facial image.

In some embodiments, the facial image to be processed may be inputted into a feature recognition model trained in advance. The feature recognition model may be used to perform feature recognition on the facial image to determine the feature of the facial image. The feature of the facial image includes, but is not limited to, gender, age, etc.

The feature recognition model may be obtained by training with a large amount of facial images in different ages and genders.

At block 202, the pixel adjustment parameter is updated based on the feature of the facial image.

People of different genders may have different skin colors. Women usually have whiter skin than men. Skin colors of a person may change with ages. Based on this, the pixel adjustment parameter may be updated based on the feature of the facial image.

As an example, when it is determined that the gender corresponding to the face in the facial image is female, the pixel adjustment parameter may be decreased. When the gender is male, the pixel adjustment parameter may be increased. A decreased or increased amount may be set based on an actual requirement.

As another example, a correspondence between different age groups and change amounts of the pixel adjustment parameter is established in advance. A change amount of the pixel adjustment parameter corresponding to an age group corresponding to the facial image is determined after the age group is determined. Then a sum of the pixel adjustment parameter and the change amount is taken as a new pixel adjustment parameter.

It should be noted that, multiple factors such as gender and age may be considered when the pixel adjustment parameter is updated.

After the pixel adjustment parameter is updated, the pixel value of each pixel of the reference cartoonized image is adjusted based on the updated pixel adjustment parameter, and the target cartoonized image corresponding to the facial image is obtained based on the adjusted pixel value of each pixel.

In some embodiments, after the pixel adjustment parameter is determined based on the target skin color and the reference skin color corresponding to the any cartoonizing model, the feature recognition may also be performed on the facial image to determine the feature of the facial image. The pixel adjustment parameter is updated based on the feature of the facial image. The pixel value of each pixel in the reference cartoonized image is adjusted based on the updated pixel adjustment parameter. In this way, by updating the pixel adjustment parameter based on the feature of the facial image, the accuracy of the pixel adjustment parameter is improved, and then the reference cartoonized image is adjusted based on the updated pixel adjustment parameter, thereby improving the effect of the target cartoonized image corresponding to the facial image.

In some embodiments of the disclosure, the pixel adjustment parameter may be determined based on the difference between the target skin color and the reference skin color when the pixel adjustment parameter is determined based on the target skin color and the reference skin color corresponding to the any cartoonizing model. The difference here may be measured by utilizing the pixel value.

As a possible implementation, a correspondence between pixel adjustment parameters and difference ranges may be established in advance. In detail, a difference degree between the target skin color and the reference skin color is determined based on the target skin color and the reference skin color of the facial image. Then, a pixel adjustment parameter corresponding to a difference range to which a difference degree between a target skin color and a reference skin color of a current facial image to be processed belongs is determined based on the correspondence between the pixel adjustment parameter and the difference range. As another possible implementation, a correspondence between the pixel adjustment parameter and a ratio range of the target skin color to the reference skin color is established in advance. In detail, a ratio of the target skin color to the reference skin color is determined based on the target skin color and the reference skin color of the facial image. A ratio range to which the ratio belongs is determined based on the correspondence, and then the pixel adjustment parameter corresponding to the ratio range is determined.

In some embodiments of the disclosure, the pixel adjustment parameter may be determined based on the difference degree between the target skin color and the reference skin color when the pixel adjustment parameter is determined based on the target skin color and the reference skin color corresponding to the any cartoonizing model. In this way, the difference between the target skin color and the reference skin color is quantified, and the pixel adjustment parameter is determined based on the difference degree, thereby improving the accuracy of the pixel adjustment parameter and improving the processing effect of the cartoonized image of the facial image.

Figure 3:
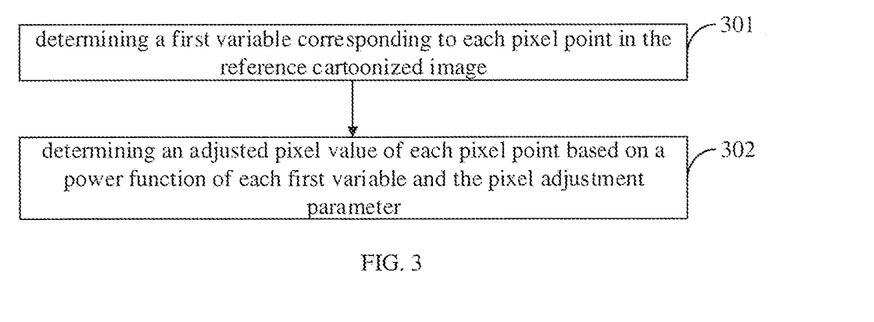
FIG. 3 is a flow chart illustrating a cartoonlization processing method for an image according to another embodiment of the disclosure.

In some embodiments of the disclosure, when the pixel value of each pixel in the reference cartoonized image is adjusted based on the pixel adjustment parameter, the method illustrated in FIG. 3 may be employed. FIG. 3 is a flow chart illustrating a cartoonlization processing method for an image according to another embodiment of the disclosure.

As illustrated in FIG. 3, the adjusting the pixel value of each pixel point in the reference cartoonized image based on the pixel adjustment parameter includes the following.

At block 301, a first variable corresponding to each pixel point in the reference cartoonized image is determined.

In some embodiments, the first variable of each pixel is a ratio of a current pixel value of the pixel point to a set coefficient. The set coefficient may be determined based on a gray level of the image. For example, if the gray level is 256, the set coefficient may be 255.

In other words, for each pixel in the reference cartoonized image, a ratio of the pixel value of the pixel point to the set coefficient may be calculated, thereby the first variable corresponding to each pixel point is obtained.

At block 302, an adjusted pixel value of each pixel point is determined based on a power function of each first variable and the pixel adjustment parameter.

After the first variable of each pixel point in the reference cartoonized image is determined, the power function may be obtained by taking the first variable as the bottom and the pixel adjustment parameter as the power. Then the adjusted pixel value of each pixel may be determined based on the power function. In detail, the power function is illustrated by $$p = l * \left(\frac{p'}{l}\right)^{\alpha}, \quad (1)$$

where p represents the adjusted pixel value, p' represents a pixel value of a pixel point in the reference image, α represents the pixel adjustment parameter, l represents the set coefficient, and $$\frac{p'}{l}$$

represents the first variable.

For example, when the set coefficient is l=255, the adjusted pixel value of each pixel point may be represented as $$p = 255 * \left(\frac{p'}{255}\right)^{\alpha}.$$

For example, when the skin color is white, α=1.0. When the skin color is light, α=1.5. When the skin color is dark, α=3.0. Based on this formula, the light skin color in the cartoonized image may be naturally adjusted to the dark skin color.

It should be noted that, the values of the set coefficient and the pixel adjustment parameter are examples, which may be set based on an actual requirement, and should not be regarded as limitations of embodiments.

After the adjusted pixel value is obtained, the pixel value of each pixel point in the reference cartoonized image is replaced with the adjusted pixel value of each pixel point, thereby the cartoonized image matching the target skin color of the facial image may be obtained.

In some embodiments of the disclosure, when the pixel value of each pixel in the reference cartoonized image is adjusted based on the pixel adjustment parameter, the first variable corresponding to each pixel in the reference cartoonized image may be determined first. Each first variable is the ratio of the current pixel value of each pixel to the set coefficient. Then the adjusted pixel value of each pixel may be determined based on the power function of each first variable and the pixel adjustment parameter. In this way, the adjusted pixel value of each pixel may be determined based on the power function of the first variable corresponding to each pixel in the reference cartoonized image and the adjustment parameter, and the target cartoonized image corresponding to the facial image to be processed may be obtained based on the adjusted pixel value of each pixel, such that cartoonlization processing may be performed on facial images with various skin colors by utilizing the existing cartoon model.

Figure 4:
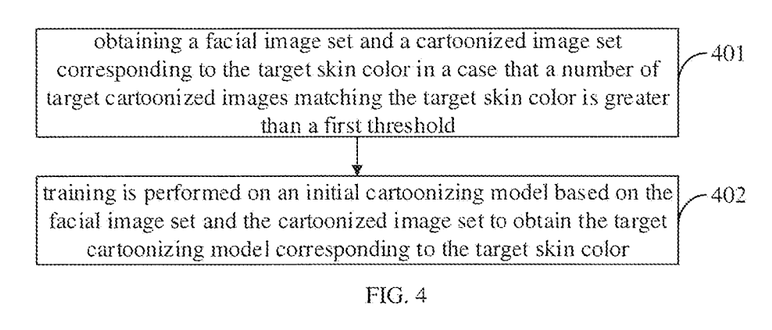
FIG. 4 is a flow chart illustrating a cartoonlization processing method for an image according to another embodiment of the disclosure.

In order to further improve the efficiency and effect of processing the facial image with the target skin color, in some embodiments of the disclosure, after the facial image with the target skin color is processed by using the above method to obtain a large amount of cartoonized images matching the target skin color, a cartoonizing model corresponding to the target skin color may be trained by utilizing these facial images and cartoonized images, such that the cartoonizing model may be configured to process an facial image with the target skin color. Description will be made below with reference to FIG. 4. FIG. 4 is a flow chart illustrating a cartoonlization processing method for an image according to another embodiment of the disclosure.

As illustrated in FIG. 4, after obtaining the target cartoonized image corresponding to the facial image, the method also includes the following.

At block 401, a facial image set and a cartoonized image set corresponding to the target skin color are obtained in a case that the number of target cartoonized images matching the target skin color is greater than a first threshold.

In some embodiments, after the target cartoonized images matching the target skin color are obtained, it may be determined whether the number of the target cartoonized images matching the target skin color is greater than the first threshold. In a case that the number of target cartoonized images matching the target skin color is greater than the first threshold, the facial image set is construed by utilizing facial images with the target skin color, and the cartoonized image set is construed by utilizing target cartoonized images corresponding to the facial images.

The greater the first threshold, the more the amount of data used for model training is, and the higher the accuracy of the trained model is. It should be noted that, the first threshold may be set as required, which is not limited in embodiments of the present disclosure.

At block 402, training is performed on an initial cartoonizing model based on the facial image set and the cartoonized image set to obtain the target cartoonizing model corresponding to the target skin color.

In some embodiments, the initial cartoonizing model may be a confrontation network, including a generator and a discriminator.

In detail, facial images in the facial image set are inputted to the generator to generate reference images. Furthermore, in order to reduce the difficulty of model training, the facial images in the facial image set may be preprocessed to obtain convex hull images corresponding to the facial images.

The convex hull image may represent positions and sizes of facial features (also called five sense organs), and may present states of opening eyes, closing eyes, opening mouth, and closing mouth by color change, it is equivalent to that the initial cartoonizing model directly knows current states of eyes and mouth, without the requirement of learning passively. In this way, the generation effect and convergence speed of the model are significantly improved After the convex hull images of the facial images are obtained, the convex hull images and the facial images are inputted to the generator to generate the reference images.

After a reference image is obtained, the reference image is inputted to the discriminator, such that the discriminator discriminates a probability that the reference image is a real image, and the probability is called a first probability for convenience of discrimination. Then, the generator and the discriminator may be modified based on a difference between the first probability and 0.

Since the reference image is an image generated by the generator, the probability that the reference image belongs to the real image is 0%. It may be seen that the greater the first probability, the greater the probability that the reference image is recognized as the real image is. However, the reference image is a generated image, it is indicated that the greater the first probability, the worse the judgment accuracy of the current discriminator is. Therefore, the discriminator is modified. The lower the first probability, the lower the probability that the reference image is recognized as the real image is, and the worse the effect of the cartoonized image generated by the generator is, so the generator is modified.

Meanwhile, the cartoonized images in the cartoonized image set may be inputted to the discriminator, and the discriminator discriminates whether the cartoonized image is real or generated by the generator. For the convenience of distinguishing, a probability outputted, when the cartoonized image in cartoonized image set is inputted to the discriminator; by the discriminator is called a second probability. Then, the discriminator is modified based on a difference between the second probability and 0. The images in the cartoonized image set are generated by the generator, thus the greater the second probability, the worse the discrimination effect of the discriminator is, so the discriminator is modified.

In a detailed implementation, deep learning may be performed on the initial cartoonizing model to obtain the cartoonizing model corresponding to the target skin color.

After the cartoonizing model corresponding to the target skin color is obtained, the cartoonizing model may be added to the cartoonizing model set. When a skin color of a face in an facial image is the target skin color, the cartoonizing model corresponding to the target skin color is used to process the facial image to obtain a corresponding cartoonized image.

For example, the cartoonizing model corresponding to the dark skin color is trained by utilizing the facial image set and the cartoonized image set. In an application scene of a video-level cartoonized image, skin color recognition may be firstly performed on a facial image detected in a video to determine a skin color of the face in the detected facial image. When the skin color of the face is dark, a cartoonizing model corresponding to the dark skin color in the cartoonizing model set is called to process the facial image to obtain the cartoonized image with the dark skin color. When the skin color of the face is light, a cartoonizing model corresponding to the light skin color is called to process the facial image to obtain a cartoonized image corresponding to the light skin color.

Meanwhile, the detected face is tracked. Since time cost of the tracking is quite little, it may avoid to perform the time-consuming skin color recognition on each frame. When the tracking is lost, skin color recognition may be performed again on a detected face, and then a corresponding model is called for processing. In this way, when a video-level cartoonized image is generated, skin color recognition may be performed adaptively, and then the cartoonized image corresponding to the skin color may be generated.

In some embodiments of the disclosure, after obtaining the target cartoonized image corresponding to the facial image, the method also includes: obtaining a facial image set and a cartoonized image set corresponding to the target skin color in a case that the number of target cartoonized images matching the target skin color is greater than a first threshold; and training performing training on an initial cartoonizing model based on the facial image set and the cartoonized image set to obtain the target cartoonizing model corresponding to the target skin color. In this way, when the number of images matching the target skin color obtained by using the existing cartoonizing model reaches a certain number, the cartoonizing model corresponding to the target skin color may be trained by utilizing the facial image set and the cartoonizing image set corresponding to the target skin color. Thus, the target cartoonizing model obtained by training may be used to perform cartoonizing processing on a facial image with the target skin color, and the cartoonized image matching the target skin color may be obtained, thereby improving the efficiency and effect of the cartoonizing processing the facial image with the target skin color.

In a practical application, a facial image generally has a certain background. In order to improve the image processing effect, in some embodiments of the disclosure, before the skin color recognition is performed on the facial image, a face segmentation model may be used to perform face segmentation on an image to be processed to obtain a facial region and a background region, and then the facial region to be processed is obtained from the image to be processed.

Alternatively, a face position may be positioned from the image to be processed by utilizing a face detection algorithm to obtain a face position frame. Then the facial region is cut out from the image to be processed and the background region is discarded based on the face position frame.

In some embodiments of the disclosure, before the skin color recognition is performed on the facial image to be processed, face segmentation may be performed on an image to be processed by utilizing the face segmentation model to obtain the facial image to be processed. In this way, by performing face segmentation on the image to be processed, the background in the image to be processed is discarded, and the facial image is obtained, such that only the facial image may be processed, and the cartoonizing processing effect for the image may be improved.

Figure 5:
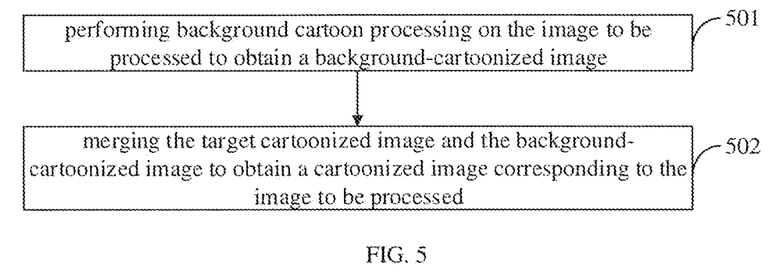
FIG. 5 is a flow chart illustrating a cartoonlization processing method for an image according to another embodiment of the disclosure.

In a practical application, cartoonlization processing may be performed on an image to be processed containing a facial image. For example, cartoonlization processing may be performed on an image containing a face, a tree and a river. In some embodiments of the disclosure, face segmentation may be perforated on the facial image to be processed to obtain a facial image and a background image. Cartoonlization processing may be performed on both the facial image and the background image respectively by using the above method. Then the facial image and the background image subjected to the cartoonlization processing are merged to obtain a cartoonized image of the image to be processed. Description will be made below with reference to FIG. 5. FIG. 5 is a flow chart illustrating a cartoonlization processing method for an image according to another embodiment of the disclosure.

As illustrated in FIG. 5, the method also includes the following.

At block 501, background cartoonlization processing is performed on the image to be processed to obtain a background-cartoonized image.

In a practical application, it is difficult to train a complete cartoonizing model for implementing cartoonlization processing on both the facial image and the background in the image, and the model effect is poor. Based on this, in some embodiments, face segmentation may be performed the facial image to be processed, and a mask of the facial region is split out, and then the background cartoonlization processing may be performed on the image to be processed by utilizing a background cartoonizing model to obtain the background-cartoonized image. The background-cartoonized image contains the mask of the facial region of the face.

When the background cartoonlization processing is performed, cartoonized images corresponding to respective background objects in the image to be processed may also be obtained from a background-cartoonized image library, and then the obtained cartoonized images are merged to obtain the background-cartoonized image. The background-cartoonized image library includes cartoonized images of various objects.

For example, the background in the image to be processed includes the sea, rocks and the beach, cartoonized images of the sea, the rocks and the beach are obtained from the background-cartoonized image library, and then the cartoonized images of these objects are merged to obtain the background-cartoonized image based on position information of the sea, the rocks and the beach in the image to be processed.

At block 502, the target cartoonized image and the background-cartoonized image are merged to obtain a cartoonized image corresponding to the image to be processed.

Face segmentation is performed on the image to be processed, the mask of the facial region is split out. A reference cartoonized image corresponding to a detected face may be obtained by utilizing an existing cartoon model, and then the target cartoonized image matching the skin color may be obtained by adjusting the reference cartoonized image. Meanwhile, the background-cartoonized image is obtained by utilizing the background cartoonizing model. Then, the target cartoonized image replaces the mask region in the background-cartoonized image to Obtain the cartoonized image corresponding to the image to be processed.

Alternatively, face segmentation may be performed on the image to be processed to obtain a facial image and a background image, and then background cartoonlization processing is performed on the background image by utilizing a trained background cartoonizing model to obtain a background-cartoonized image. After the cartoonized image corresponding to the facial image and the background-cartoonized image corresponding to the background in the image to be processed are obtained, the target cartoonized image and the background-cartoonized image may be spliced based on the position information of each pixel in the facial image and the background image in the image to be processed to obtain the cartoonized image corresponding to the image to be processed.

In embodiments of the disclosure, the background cartoonlization processing may be performed on the image to be processed to obtain the background-cartoonized image, and then the target cartoonized image and the background cartoonized image are merged to obtain the cartoonized image corresponding to the image to be processed. In this way, the background-cartoonized image is obtained by performing background cartoonlization processing on the image to be processed, and the background-cartoonized image and the cartoonized image corresponding to the facial image are merged to implement cartoonlization processing on the image to be processed.

Figure 6:
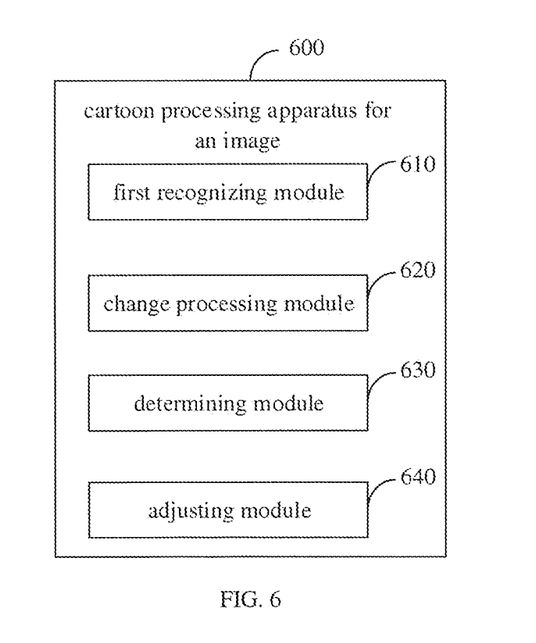
FIG. 6 is a block diagram illustrating a cartoonlization processing apparatus for an image according to embodiments of the disclosure.

In order to achieve the above embodiments, embodiments of the disclosure also provide a cartoonlization processing apparatus for an image. FIG. 6 is a block diagram illustrating a cartoonlization processing apparatus for an image according to embodiments of the disclosure.

As illustrated in FIG. 6, the cartoonlization processing apparatus 600 for the image includes: a first recognizing module 610, a change processing module 620, a determining module 630, and an adjusting module 640.

The first recognizing module 610 is configured to perform skin color recognition on a facial image to be processed to determine a target skin color of a face in the facial image.

The change processing module 620 is configured to process the facial image by utilizing any cartoonizing model in a cartoonizing model set to obtain a reference cartoonized image corresponding to the facial image in a case that the set of cartoonizing model set does not contain a cartoonizing model corresponding to the target skin color.

The determining module 630 is configured to determine a pixel adjustment parameter based on the target skin color and a reference skin color corresponding to the any cartoonizing model.

The adjusting module 640 is configured to adjust a pixel value of each pixel point in the reference cartoonized image based on the pixel adjustment parameter, to obtain a target cartoonized image corresponding to the facial image.

In a possible implementation of embodiments of the disclosure, the apparatus also includes: a second recognizing module, and an update module.

The second recognizing module is configured to perform feature recognition on the facial image to determine a feature of the facial image.

The update module is configured to update the pixel adjustment parameter based on the feature of the facial image.

In a possible implementation of embodiments of the disclosure, the determining module 630 is configured to: determine the pixel adjustment parameter based on a difference degree between the target skin color and the reference skin color.

In a possible implementation of embodiments of the disclosure, the adjusting module 640 includes: a first determining unit, and a second determining unit.

The first determining unit is configured to determine a first variable corresponding to each pixel point in the reference cartoonized image.

The first variable is a ratio of a current pixel value of the pixel point to a set coefficient. The second determining unit is configured to determine an adjusted pixel value of each pixel point based on a power function of each first variable and the pixel adjustment parameter.

In a possible implementation of embodiments of the disclosure, the apparatus also includes: an obtaining module, and a training module.

The obtaining module is configured to obtain a facial image set and a cartoonized image set corresponding to the target skin color in a case that the number of target cartoonized images matching the target skin color is greater than a first threshold.

The training module is configured to perform training on an initial cartoonizing model based on the facial image set and the cartoonized image set to obtain the target cartoonizing model corresponding to the target skin color.

In a possible implementation of embodiments of the disclosure, the apparatus also includes: a segmenting module, configured to perform face segmentation on an image to be processed by utilizing a face segmentation model to obtain the facial image to be processed.

In a possible implementation of embodiments of the disclosure, the apparatus also includes: a background processing module, and a merging module.

The background processing module is configured to perform background cartoonlization processing on the image to be processed to obtain a background-cartoonized image.

The merging module is configured to merge the target cartoonized image with the background-cartoonized image to obtain a cartoonized image corresponding to the image to be processed.

It should be noted that, description for embodiments of the cartoonlization processing method for the image is also applicable to the cartoonlization processing apparatus for the image according to this embodiment, which is not elaborated here.

With the cartoonlization processing apparatus for an image according to embodiments of the disclosure, the skin color recognition is performed on the facial image to be processed to determine the target skin color of the face in the facial image. In the case that the cartoonizing model set does not contain the cartoonizing model corresponding to the target skin color, the facial image is processed by utilizing the any cartoonizing model to obtain the reference cartoonized image corresponding to the facial image. The pixel adjustment parameter is determined based on the target skin color and the reference skin color corresponding to the any cartoonizing model. The pixel value of each pixel point in the reference cartoonized image is adjusted based on the pixel adjustment parameter to obtain the target cartoonized image corresponding to the facial image. In this way, when the cartoonizing model set does not contain the cartoonizing model corresponding to the target skin color of the facial image, the facial image is processed by utilizing an existing cartoonizing model to obtain the reference cartoonized image, and then the reference cartoonized image is adjusted based on the target skin color and the reference skin color corresponding to the existing cartoonizing model to obtain the cartoonized image corresponding to the target skin color. Therefore, by utilizing the existing cartoonizing model, cartoonlization processing on objects with various skin colors may be implemented, and an application range is expanded.

According to embodiments of the disclosure, the disclosure also provides an electronic device and a readable storage medium.

Figure 7:
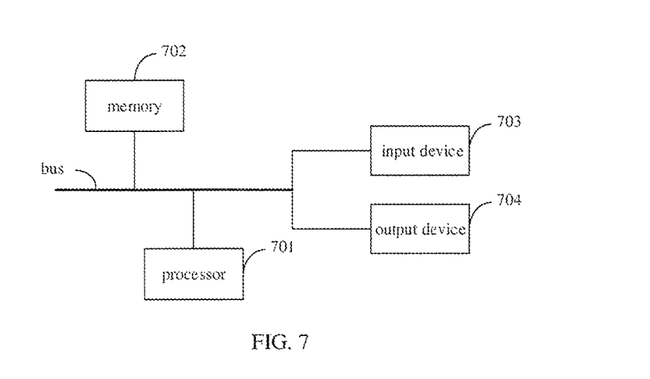
FIG. 7 is a block diagram illustrating an electronic device for implementing a cartoonlization processing method for an image according to embodiments of the disclosure.

As illustrated in FIG. 7, FIG. 7 is a block diagram illustrating an electronic device for implementing a cartoonlization processing method for an image according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 7, the electronic device includes: one or more processors 701 a memory 702, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 701 is taken as an example.

The memory 702 is a non-transitory computer readable storage medium provided by the disclosure. The memory is configured to store instructions executable by at least one processor, to enable the at least one processor to execute the cartoonlization processing method for an image provided by the disclosure. The non-transitory computer readable storage medium provided by the disclosure is configured to store computer instructions. The computer instructions are configured to enable a computer to execute the cartoonlization processing method for a image provided by the disclosure.

As the non-transitory computer readable storage medium, the memory 702 may be configured to store non-transitory software programs, non-transitory computer executable programs and modules, such as program instructions/module (such as the first recognizing module 610, the change processing module 620, the determining module 630, and the adjusting module 640 illustrated in FIG. 6) corresponding to the cartoonlization processing method for an image according to embodiments of the disclosure. The processor 701 is configured to execute various functional applications and data processing of the server by operating non-transitory software programs, instructions and modules stored in the memory 702, that is, implements the cartoonlization processing method for an image according to the above method embodiments.

The memory 702 may include a storage program region and a storage data region. The storage program region may store an application required by an operating system and at least one function. The storage data region may store data created according to predicted usage of the electronic device capable of implementing the cartoonlization processing method for an image. In addition, the memory 702 may include a high-speed random access memory, and may also include a non-transitory memory, such as at least one disk memory device, a flash memory device, or other non-transitory solid-state memory device. In some embodiments, the memory 702 may optionally include memories remotely located to the processor 701, and these remote memories may be connected to the electronic device via at network. Examples of the above network include, but are not limited to, an Internet, an intranet, a local area network, a mobile communication network and combinations thereof.

The electronic device capable of implementing the cartoonlization processing method for an image may also include: an input device 703 and an output device 704. The processor 701, the memory 702, the input device 703, and the output device 704 may be connected via a bus or in other means. In FIG. 7, the bus is taken as an example.

The input device 703 may receive inputted digital or character information, and generate key signal input related to user setting and function control of the electronic device capable of implementing the cartoonlization processing method for the image, such as a touch screen, a keypad, a mouse, a track pad, a touch pad, an indicator stick, one or more mouse buttons, a trackball, a joystick and other input device. The output device 704 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user; a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other. The server may be a cloud server, also known as a cloud computing server or a cloud host, which is a host product in a cloud computing service system, to solve difficult management and weak business scalability in conventional physical host and VPS (virtual private server) services.

According to the technical solution of embodiments of the disclosure, when the cartoonizing model set does not contain the cartoonizing model corresponding to the target skin color of the facial image, the facial image is processed by utilizing an existing cartoonizing model to obtain the reference cartoonized image, and then the reference cartoonized image is adjusted based on the target skin color and the reference skin color corresponding to the existing cartoonizing model to obtain the cartoonized image corresponding to the target skin color. Therefore, by utilizing the existing cartoonizing model, cartoonlization processing on objects with various skin colors may be implemented, and an application range is expanded.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A cartoonlization processing method for an image, comprising:

performing skin color recognition on a facial age to be processed to determine a target skin color of a face in the facial image;

in a case that a cartoonizinq model set contains a cartoonizinq model corresponding to the target skin color, processing the facial image by using the cartoonizinq model corresponding to the target skin color to obtain a cartoonized image corresponding to the target skin color, and in a case that the cartoonizing model set does not contain the cartoonizinq model corresponding to the target skin color:

processing the facial image by utilizing any of the cartoonizing models in the cartoonizing model set to obtain a reference cartoonized image corresponding to the facial image;

determining a pixel adjustment parameter based on the target skin color and a reference skin color corresponding to the any cartoonizing model utilized for processing the facial image; and adjusting a pixel value of each pixel point of the plurality of the pixel points in the reference cartoonized image based on the pixel adjustment parameter, to obtain a target cartoonized image corresponding to the facial image;

wherein adjusting the pixel value of each pixel point of the plurality of the pixel points in the reference cartoonized image based on the pixel adjustment parameter comprises:
  determining a first variable corresponding to each pixel point in the reference cartoonized image, the first variable being a ratio of a current pixel value of the pixel point in the reference cartoonized image to a set coefficient; and
  determining an adjusted pixel value of each pixel point based on a power function of each first variable and the pixel adjustment parameter.

2. The method of claim 1, before determining the pixel adjustment parameter based on the target skin color and the reference skin color corresponding to the cartoonizing model utilized for processing the facial image, further comprising:
  performing feature recognition on the facial image to determine a feature of the facial image; and
  updating the pixel adjustment parameter based on the feature of the facial image.

3. The method of claim 1, wherein determining the pixel adjustment parameter based on the target skin color and the reference skin color corresponding to the cartoonizing model utilized for processing the facial image comprising:
  determining the pixel adjustment parameter based on a difference degree between the target skin color and the reference skin color.

4. The method of claim 1, after obtaining the target cartoonized image corresponding to the facial image, further comprising:
  obtaining a facial image set and a cartoonized image set corresponding to the target skin color in a case that a number of target cartoonized images matching the target skin color is greater than a first threshold; and
  performing training on an initial cartoonizing model based on the facial image set and the cartoonized image set to obtain the target cartoonizing model corresponding to the target skin color.

5. The method of claim 1, before performing skin color recognition on the facial image to be processed, further comprising:
  performing face segmentation on an image to be processed by utilizing a face segmentation model to obtain the facial image to be processed.

6. The method of claim 5, further comprising:
  performing background cartoonlization processing on the image to be processed to obtain a background-cartoonized image; and
  merging the target cartoonized image and the background-cartoonized image to obtain a cartoonized image corresponding to the image to be processed.

7. An electronic device, comprising:
  at least one processor; and
  a memory, communicatively coupled to the at least one processor,
  wherein the memory is configured to store instructions executable by the at least one processor, and when the instructions are executed by the at least one processor, the at least one processor is caused to execute a cartoonlization processing method for an image, the method comprising:
  performing skin color recognition on a facial image to be processed to determine a target skin color of a face in the facial image;
  in a case that a cartoonizing model set contains a cartoonizing model corresponding to the target skin color, processing the facial image by using the cartoonizing model corresponding to the target skin color to obtain a cartoonized image corresponding to the target skin color,
  and in a case that the cartoonizing model set does not contain the cartoonizing model corresponding to the target skin color:
  processing the facial image by utilizing any of the cartoonizing models in the cartoonizing model set to obtain a reference cartoonized image corresponding to the facial image;
  determining a pixel adjustment parameter based on the target skin color and a reference skin color corresponding to the cartoonizing model utilized for processing the facial image; and
  adjusting a pixel value of each pixel point of the plurality of the pixel points in the reference cartoonized image based on the pixel adjustment parameter, to obtain a target cartoonized image corresponding to the facial image;
  wherein adjusting the pixel value of each pixel point of the plurality of the pixel points in the reference cartoonized image based on the pixel adjustment parameter comprises:
  determining a first variable corresponding to each pixel point in the reference cartoonized image, the first variable being a ratio of a current pixel value of the pixel point in the reference cartoonized image to a set coefficient; and
  determining an adjusted pixel value of each pixel point based on a power function of each first variable and the pixel adjustment parameter.

8. The electronic device of claim 7, wherein, before determining the pixel adjustment parameter based on the target skin color and the reference skin color corresponding to the cartoonizing model utilized for processing the facial image, the method further comprises: performing feature recognition on the facial image to determine a feature of the facial image: and updating the pixel adjustment parameter based on the feature of the facial image.

9. The electronic device of claim 7, wherein determining the pixel adjustment parameter based on the target skin color and the reference skin color corresponding to the cartoonizing model utilized for processing the facial image comprising:
  determining the pixel adjustment parameter based on a difference degree between the target skin color and the reference skin color.

10. The electronic device of claim 7, wherein, after obtaining the target cartoonized image corresponding to the facial image, the further comprises:
  obtaining a facial image set and a cartoonized image set corresponding to the target skin color in a case that a number of target cartoonized images matching the target skin color is greater than a first threshold; and
  performing training on an initial cartoonizing model based on the facial image set and the cartoonized image set to obtain the target cartoonizing model corresponding to the target skin color.

11. The electronic device of claim 7, wherein, before performing skin color recognition on the facial image to be processed, the method further comprises:
  performing face segmentation on an image to be processed by utilizing a face segmentation model to obtain the facial image to be processed.

12. The electronic device of claim 11, wherein the further comprises:
  performing background cartoonlization processing on the image to be processed to obtain a background-cartoonized image; and
  merging the target cartoonized image and the background-cartoonized image to obtain a cartoonized image corresponding to the image to be processed.

13. A non-transitory computer readable storage medium having computer instructions stored thereon, wherein the computer instructions are configured to cause a computer to execute the cartoonlization processing method for an image, the method comprising:
  performing skin color recognition on a facial image to be processed to determine a target skin color of a face in the facial image;
  in a case that a cartoonizinq model set contains a cartoonizinq model corresponding to the target skin color, processing the facial image by using the cartoonizing model corresponding to the target skin color to obtain a cartoonized image corresponding to the target skin color,
  and in a case that the cartoonizinq model set does not contain the cartoonizinq model corresponding to the target skin color:
  processing the facial image by utilizing any of the cartoonizing models in the cartoonizing model set to obtain a reference cartoonized image corresponding to the facial image in a case that the cartoonizing model set does not contain a cartoonizing model corresponding to the target skin color;
  determining a pixel adjustment parameter based on the target skin color and a reference skin color corresponding to the cartoonizing model utilized for processing the facial image; and
  adjusting a pixel value of each pixel point of the plurality of the pixel points in the reference cartoonized image based on the pixel adjustment parameter, to obtain a target cartoonized image corresponding to the facial image;
  wherein adjusting the pixel value of each pixel point of the plurality of the pixel points in the reference cartoonized image based on the pixel adjustment parameter comprises:
  determining a first variable corresponding to each pixel point in the reference cartoonized image, the first variable being a ratio of a current pixel value of the pixel point in the reference cartoonized image to a set coefficient; and
  determining an adjusted pixel value of each pixel point based on a power function of each first variable and the pixel adjustment parameter.

14. The storage medium of claim 13, wherein, before determining the pixel adjustment parameter based on the target skin color and the reference skin color corresponding to the ilany llcartoonizing model utilized for processing the facial image, the method further comprises:
  performing feature recognition on the facial image to determine a feature of the facial image; and
  updating the pixel adjustment parameter based on the feature of the facial image.

15. The storage medium of claim 13, wherein determining the pixel adjustment parameter based on the target skin color and the reference skin color corresponding to the cartoonizing model utilized for processing the facial image comprising:
  determining the pixel adjustment parameter based on a difference degree between the target skin color and the reference skin color.

16. The storage medium of claim 13, wherein, after obtaining the target cartoonized image corresponding to the facial image, the further comprises:
  obtaining a facial image set and a cartoonized image set corresponding to the target skin color in a case that a number of target cartoonized images matching the target skin color is greater than a first threshold; and
  performing training on an initial cartoonizing model based on the facial image set and the cartoonized image set to obtain the target cartoonizing model corresponding to the target skin color.

17. The storage medium of claim 13, wherein, before performing skin color recognition on the facial image to be processed, the method further comprises:
  performing face segmentation on an image to be processed by utilizing a face segmentation model to obtain the facial image to be processed.

* * * * *